United States Patent
Hamlin

(10) Patent No.: US 7,155,616 B1
(45) Date of Patent: Dec. 26, 2006

(54) COMPUTER NETWORK COMPRISING NETWORK AUTHENTICATION FACILITIES IMPLEMENTED IN A DISK DRIVE

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 951 days.

(21) Appl. No.: 09/630,069

(22) Filed: Jul. 31, 2000

(51) Int. Cl.
*H04L 9/32* (2006.01)

(52) U.S. Cl. ............... 713/193; 713/189; 709/229; 711/112; 726/4

(58) Field of Classification Search ............ 380/20–50; 705/35; 709/229; 713/169, 200, 193; 711/111, 711/112, 113, 114
See application file for complete search history.

(56) References Cited

U.S. PATENT DOCUMENTS

| | | | |
|---|---|---|---|
| 4,757,534 A | 7/1988 | Matyas et al. | |
| 5,235,641 A | 8/1993 | Nozawa et al. | |
| 5,463,690 A | 10/1995 | Crandall | |
| 5,465,183 A | 11/1995 | Hattori | |
| 5,583,712 A | 12/1996 | Brunelle | |
| 5,592,555 A | 1/1997 | Stewart | |
| 5,657,470 A | 8/1997 | Fisherman et al. | |
| 5,677,952 A | 10/1997 | Blakley | |
| 5,687,237 A * | 11/1997 | Naclerio ............ 380/29 | |
| 5,805,699 A | 9/1998 | Akiyama et al. | |
| 5,883,958 A | 3/1999 | Ishiguro et al. | |
| 5,915,018 A | 6/1999 | Aucsmith | |
| 5,923,754 A | 7/1999 | Angelo et al. | |
| 5,930,358 A | 7/1999 | Rao | |
| 5,931,947 A | 8/1999 | Burns et al. | |
| 5,995,624 A | 11/1999 | Fielder et al. | |
| 6,061,794 A | 5/2000 | Angelo et al. | |
| 6,064,989 A | 5/2000 | Cordery et al. | |
| 6,085,320 A | 7/2000 | Kaliski, Jr. | |
| 6,144,743 A | 11/2000 | Yamada et al. | |
| 6,189,098 B1 | 2/2001 | Kaliski, Jr. | |
| 6,226,750 B1 | 5/2001 | Trieger | |
| 6,230,269 B1 | 5/2001 | Spies et al. | |
| 6,253,323 B1 | 6/2001 | Cox et al. | |
| 6,289,102 B1 | 9/2001 | Ueda et al. | |

(Continued)

FOREIGN PATENT DOCUMENTS

| | | |
|---|---|---|
| EP | 0816967 A2 | 1/1998 |
| EP | 0911738 A2 | 4/1999 |

OTHER PUBLICATIONS

Bennet Yee, J.D. Tygar, "Secure Coprocessors in Electronic Commerce Applications", First USENIX Workshop on Electronic Commerce, Jul. 11-12, 1995, 155-170.

(Continued)

*Primary Examiner*—Jacques H. Louis-Jacques
*Assistant Examiner*—Ellen C Tran
(74) *Attorney, Agent, or Firm*—Howard H. Sheerin, Esq.

(57) ABSTRACT

A computer network is disclosed comprising a plurality of interconnected network devices including a plurality of client computers, an authentication server computer operated by a system administrator, and a disk drive connected to the authentication server computer. The disk drive comprises an interface for receiving the personal authentication data and user access data from the system administrator, a disk for storing data, and a disk controller for controlling access to the disk. An authenticator within the disk drive, responsive to the personal authentication data, enables the disk controller, and cryptographic circuitry encrypts the user access data received from the system administrator into encrypted data stored on the disk.

23 Claims, 5 Drawing Sheets

U.S. PATENT DOCUMENTS

| | | |
|---|---|---|
| 6,289,451 B1 | 9/2001 | Dice |
| 6,289,457 B1 | 9/2001 | Bishop et al. |
| 6,363,487 B1 | 3/2002 | Schneider |
| 6,397,333 B1 | 5/2002 | Sohne et al. |
| 6,405,315 B1 | 6/2002 | Burns et al. |
| 6,434,700 B1 * | 8/2002 | Alonso et al. ............. 713/169 |
| 6,438,235 B1 | 8/2002 | Sims, III |
| 6,473,809 B1 | 10/2002 | Aref et al. |
| 6,473,861 B1 | 10/2002 | Stokes |
| 6,550,009 B1 | 4/2003 | Uranaka et al. |
| 6,609,199 B1 * | 8/2003 | DeTreville ................ 713/172 |
| 6,615,264 B1 * | 9/2003 | Stoltz et al. .............. 709/227 |
| 6,823,398 B1 | 11/2004 | Lee et al. |
| 2001/0032088 A1 | 10/2001 | Utsumi et al. |
| 2003/0191816 A1 | 10/2003 | Landress et al. |

OTHER PUBLICATIONS

Howard Gobioff, "Security for a High Performance Commodity Storage Subsystem", School of Computer Science, Carnegie Mellon University, CMU-CS-99-160, Jul. 1999, pp. 171-178.

Rodney Van Meter, Steve Hotz, Gregory Finn, "Derived Virtual Devices: A Secure Distributed File System Mechanism", In Proceedings of the Fifth NASA Goddard Space Flight Center Conference on Mass Storage Systems and Technologies, Sep. 1996.

Garth A. Gibson, David F. Nagle, Khalil Amiri, Fay W. Chang, Howard Gobioff, Erik Riedel, David Rochberg, and Jim Zelenka, "Filesystems for Network-Attached Secure Disks", Jul. 1997, 1-18, CMU-CS-97-118, School of Computer Science, Carnegie Mellon University, Pittsburgh, Pennsylvania.

Howard Gobioff, Garth Gibson, and Doug Tybar, "Security for Network Attached Storage Devices", Oct. 23, 1997, 1-18, CMU-CS-97-185, School of Computer Science, Carnegie Mellon University, Pittsburgh, PA 15213.

"Digital Transmission License Agreement", www.dtcp.com.

"Digital Transmission Content Protection Specification", vol. 1, Revision 1.0, Apr. 12, 1999, www.dtcp.com.

"5C Digital Transmission Content Protection White Paper", Revision 1.0, Jul. 14, 1998, www.dtcp.com.

Erik Ottem, "White Papers: Hold on to Your Memory: Password Protection for Disc Drive Security", Jun., 1996, http://www.seagate.com/newsinfo/newsroom/papers/D2c9.html.

William Stallings, "Cryptography and Network Security, Principles and Practice, Second Edition", 1999, 1995, Prentice Hall, Inc. ISBN 0-13-869017-0.

Steve Grossman, "Two-Chip Set Safeguards Digital Video Content", Electronic Design, Jun. 12, 2000, pp. 68-72.

Microsoft, Computer Dictionary, 5th Edition, 2002, p. 165.

Bertino et al., "Advanced Transaction Processing in Multilevel Secure File Stores", 1998, IEEE 1041-4347/98, pp. 120-135.

Menezes et al., "Handbook of Applied Cryptography", 1997, CRC Press, pp. 171, 357-358.

Menezes et al., "Handbook of Applied Cryptography", 1997, CRC Press, pp. 500-501.

* cited by examiner

COMPUTER NETWORK COMPRISING NETWORK AUTHENTICATION FACILITIES IMPLEMENTED IN A DISK DRIVE

BACKGROUND OF THE INVENTION

1. Field of the Invention

The present invention relates to computer networks. More particularly, the present invention relates to a computer network comprising network authentication facilities implemented in a disk drive.

2. Description of the Prior Art

Computer networks comprise a number of interconnected network devices (server computers, client computers, disk drives, printers, etc.) which communicate with one another through a network communication protocol (Ethernet, ATM, etc.). Each device is typically assigned an address which identifies the device, where the device address is used to route messages to and from the device through the network. For example, a client computer may request access to a server computer by sending a message to the server computer. The message typically comprises the address of the server computer for routing the initial message, as well as the address of the client computer for routing a reply message.

Computer networks also typically employ authentication services which manage and enforce user access rights with respect to each network device. For example, a mail server may be configured so that it is accessible only by authorized users with established accounts. The authentication facility may be implemented by each network device by storing a list of authorized users and associated authentication data (e.g., passwords). When a user sends an access request to a network device, the network device will verify that the user has the appropriate access rights. In an open environment, however, this implementation can place a substantial burden on each network device as well as complicate the administrative task required to manage the user access rights for each network device.

An alternative is to use an authentication server which maintains the user IDs and associated authentication data in a centralized authentication database. Users requesting access to a particular network device must first be authenticated by the authentication server. Once authenticated, the authentication server transmits device access data to the user's client computer which is then used to access the network device. This approach is employed by the Kerberos authentication service developed as part of Project Athena at MIT. An overview of the Kerberos authentication service is provided by William Stallings in a text book entitled *Cryptography and Network Security*, $2^{nd}$ edition, 1999, 1995 by Prentice Hall, pp. 323–353, which is herein incorporated by reference.

FIG. 1 illustrates the Kerberos authentication service in a computer network comprising a plurality of interconnected network devices including an authentication server 2, a network server 4 (e.g., a mail or file server), and a local area network (LAN) 6, all of which communication through a network routing facility 10. The authentication server 2 is configured by a person 12 (a system administrator) with the user access data associated with each of the network devices. For example, the system administrator 12 may input a plurality of user identifiers and associated passwords together with the user's access rights to the plurality of network devices. This information is stored in a central authentication database in non-volatile memory, for example, in disk drive 14.

The authentication server 2 will typically authenticate the system administrator 12 before allowing any modifications to the central authentication database. The system administrator 12 provides personal authentication data to the authentication server 2 known only to the system administrator, such as a password, voiceprint, fingerprint, etc. The authentication server 2 authenticates the system administrator 12 by comparing the received personal authentication data to authentication data stored locally (e.g., on disk drive 14).

When a user (e.g., user 16) requests access to one of the network devices (e.g., network server 4), the user 16 presents a user ID together with an access request to the authentication server 2 through the user's client computer 18 via the network routing facility 10. The authentication server 2 evaluates the authentication database to determine whether the user ID has been granted the access rights requested. If so, the authentication server 2 transmits, via the network routing facility 10, device access data to the user's client computer 18, and the client computer 18 uses the device access data to access the network server 4.

The network server 4 shares a secret key with the authentication server 2 which is used to enforce the access rights contained in the central authentication data base. The network server 4 uses the secret key to decrypt the device access data received in a device access request; if the decrypted access data is authentic, then the request is serviced, otherwise the request is denied.

The device access data is typically encrypted when transmitted from the authentication server 2 to the client computer 18, and when transmitted from the client computer 18 to the network server 4. With advanced cryptography, it is extremely difficult to decipher an encrypted message, even if intercepted by an attacker, without the secret key used to decrypt the message. Thus, attackers are now focusing their efforts on the network devices involved in the secure transactions (e.g., the authentication server, client computers, network servers, etc.) in an attempt to discover the plaintext data before encryption or after decryption, or to discover information that will help reveal the secret cryptographic keys. To this end, an attacker may physically probe a network device using special software, such as debuggers or decompilers, or special hardware, such as logic analyzers or in-circuit emulators. An attacker may also perform a remote attack on a network device using a virus program which invades the device's operating system to reveal protected information. For example, a virus may be attached to an email and transmitted to a network device through the network routing facility 10.

The authentication server 2 of FIG. 1 is susceptible to physical probing attacks as well as remote virus attacks since the access control management is performed by a conventional operating system running on a conventional central processing unit (CPU). Similarly, network devices, such as the network server 4, are susceptible to attack since they enforce access control at the operating system level using a conventional CPU. In addition, the central authentication database configured by the system administrator 12 as well as the cryptographic keys shared with the network devices are susceptible to attack if stored in plaintext form. For example, an attacker may probe the disk drive 14 attached to the authentication server 2 or the disk drive 20 attached to network server 4 in an attempt to discover the user access data and/or the secret cryptographic keys stored in plaintext form.

There is, therefore, a need to improve the security of authentication services for computer networks, particularly with respect to the authentication server and the secret keys shared with the network devices.

SUMMARY OF THE INVENTION

The present invention may be regarded as a computer network comprising a plurality of interconnected network devices including a plurality of client computers, an authentication server computer operated by a system administrator, and a disk drive connected to the authentication server computer. The disk drive comprises an interface for receiving personal authentication data and user access data from the system administrator, a disk for storing data, and a disk controller for controlling access to the disk. An authenticator within the disk drive, responsive to the personal authentication data, enables the disk controller, and cryptographic circuitry within the disk drive encrypts the user access data received from the system administrator into encrypted data stored on the disk.

In one embodiment, the user access data comprises a plurality of user identifiers and corresponding access rights to the plurality of network devices.

The present invention may also be regarded as a computer network comprising a plurality of interconnected network devices including a plurality of client computers, an authentication server computer, and a disk drive connected to the authentication server computer. The disk drive comprises an interface for receiving from a client computer a user ID and a user access request to access a network device, and for transmitting device access data to the client computer. The disk drive further comprises a disk for storing encrypted data, and a disk controller, responsive to the user ID and user access request, for controlling access to the disk. Cryptographic circuitry within the disk drive decrypts the encrypted data stored on the disk to generate decrypted data, and the disk controller uses the decrypted data to generate the device access data transmitted to the client computer.

In one embodiment, the encrypted data comprises encrypted user authentication data corresponding to the user ID, and the cryptographic circuitry decrypts the encrypted user authentication data to generate decrypted user authentication data.

The present invention may also be regarded as a computer network comprising a plurality of interconnected network devices including a plurality of client computers, an authentication server, and a disk drive. The disk drive comprises an interface for receiving an encrypted device access request and for inputting/outputting user data from/to a client computer, a disk for storing data, and a disk controller for controlling access to the disk. The disk drive further comprises an internal drive key, and a secret device key shared with the authentication server, the secret device key stored in encrypted form. Cryptographic circuitry within the disk drive, responsive to the internal drive key, decrypts the encrypted secret device key to generate a decrypted secret device key, and an authenticator within the disk drive, responsive to the decrypted secret device key, authenticates the device access request.

In one embodiment the encrypted secret device key is stored on the disk, in another embodiment the encrypted secret device key is configured during manufacture of the disk drive, and in yet another embodiment the disk drive transmits the encrypted secret device key to the authentication server.

DESCRIPTION OF THE PREFERRED EMBODIMENTS

Figure 2:
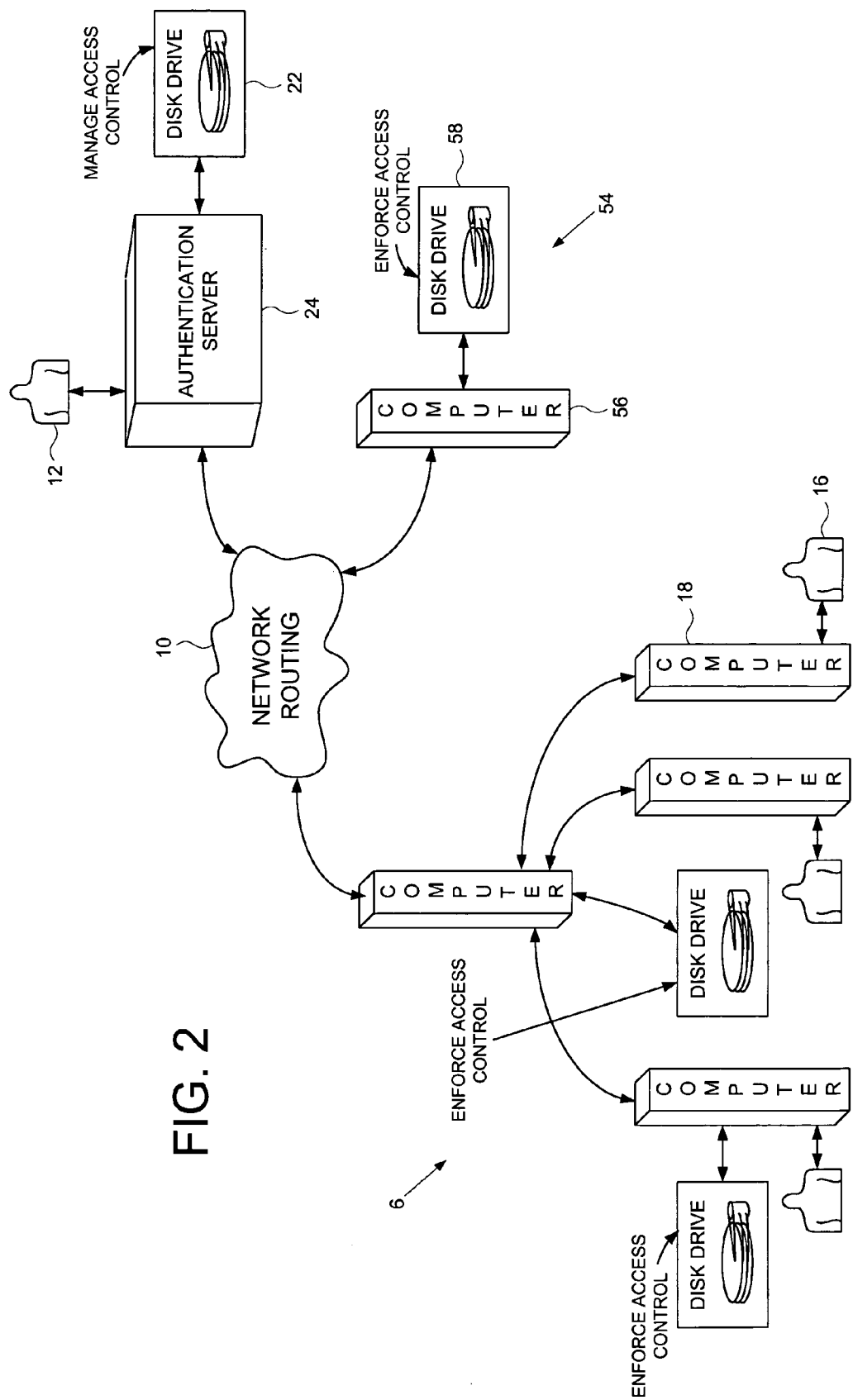
FIG. 2 is a computer network according to an embodiment of the present invention comprising a plurality of interconnected network devices, including an authentication server for implementing access management within a disk drive connected to the authentication server.
Figure 3:
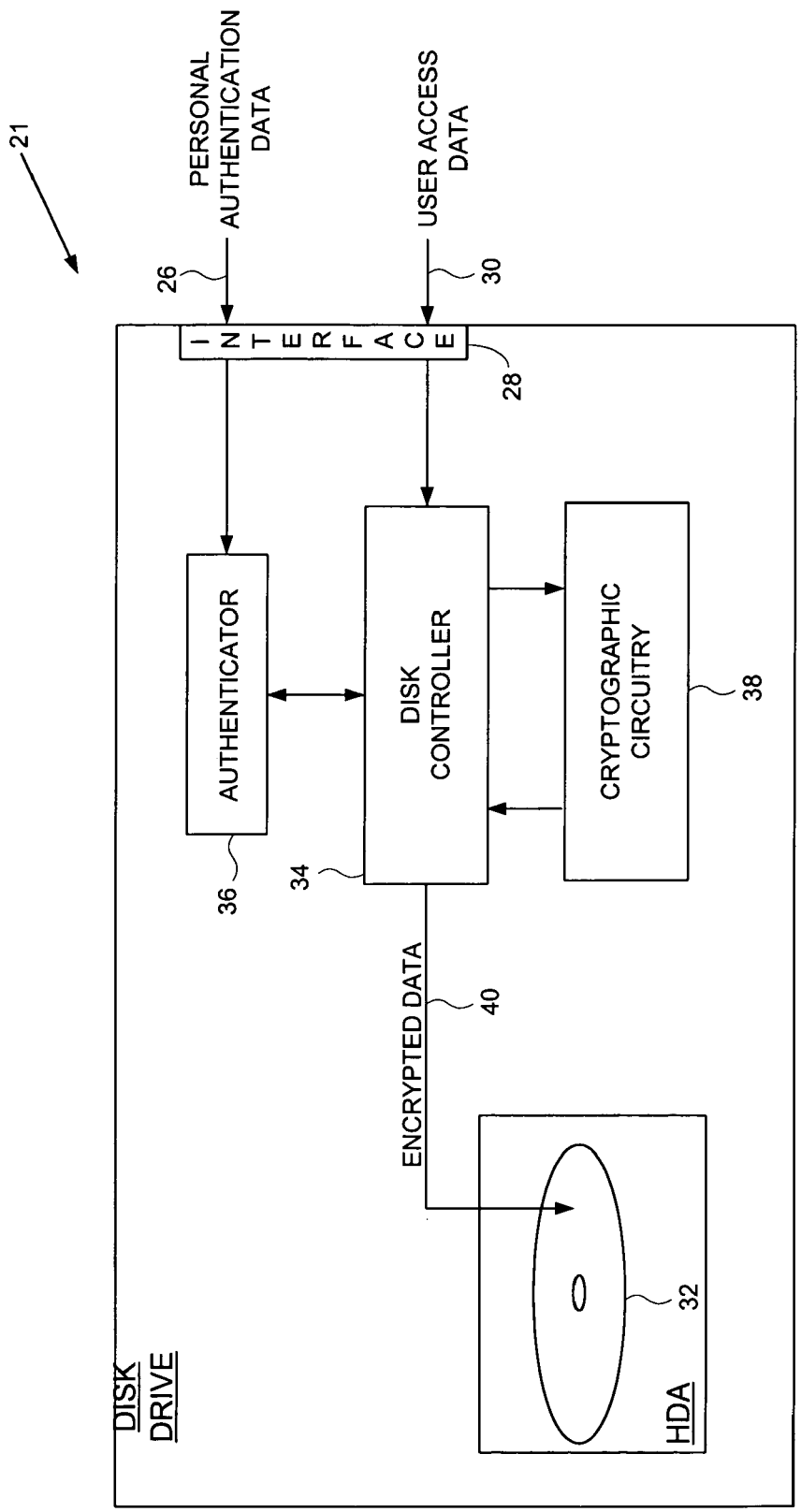
FIG. 3 shows a disk drive according to an embodiment of the present invention comprising an interface for receiving personal authentication data identifying a person (e.g., a system administrator) and user access data for accessing the plurality of network devices, wherein the user access data is stored in encrypted form on a disk.

FIG. 2 shows a computer network according to an embodiment of the present invention as comprising a plurality of interconnected network devices including a plurality of client computers 18, an authentication server computer 24 operated by a system administrator 12, and a disk drive 22 connected to the authentication server computer 24. FIG. 3 shows a disk drive 21 according to an embodiment of the present invention for use as the disk drive 22 connected to the authentication server computer 24 in the computer network of FIG. 2. The disk drive 21 comprises an interface 28 for receiving personal authentication data 26 and user access data 30 from the system administrator 12, a disk 32 for storing data, and a disk controller 34 for controlling access to the disk 32. An authenticator 36 within the disk drive 21, responsive to the personal authentication data 26, enables the disk controller 34, and cryptographic circuitry 38 within the disk drive 21 encrypts the user access data 30 received from the authentication server computer 24 into encrypted data 40 stored on the disk 32.

In one embodiment, the user access data 30 comprises a plurality of user identifiers and corresponding access rights to the plurality of network devices. The user identifier may be, for example, a user id, and the access rights may be, for example, read/write access to a particular file or partition of a disk drive connected to the network. The user access data 30 may also comprise user authentication data, such as a user password.

In the embodiment of FIG. 2, the system administrator 12 is responsible for managing the user access data for the network which is stored in encrypted form on the disk drive 22 in a central database. Before allowing modifications to the central database, the system administrator 12 is first authenticated by transmitting personal authentication data 30 to the disk drive 22. In one embodiment, the personal authentication data 30 comprises a user password known only to the system administrator 12. The password is entered into a keyboard (not shown), and transmitted via the authentication server computer 24 to the disk drive 22 as the personal authentication data 26. The authenticator 36 (FIG. 3) within the disk drive 22 evaluates the password in order to authenticate the system administrator 12, for example, by comparing the received password to a password stored locally.

Figure 1:
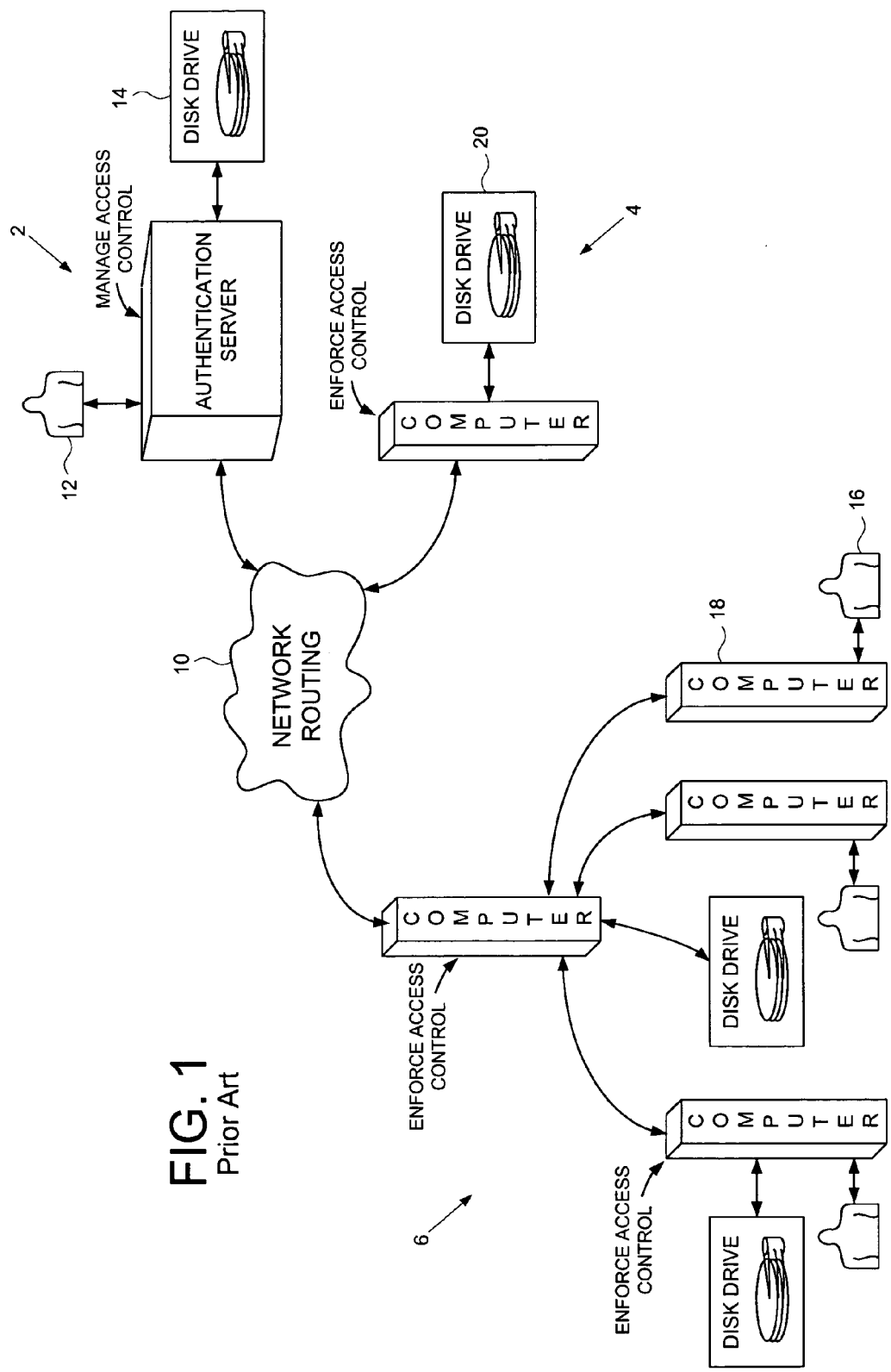
FIG. 1 shows a conventional computer network comprising a plurality of interconnected network devices, including an authentication server for implementing access management at the operating system level using a conventional CPU.

Implementing the authentication service within the disk drive 22 is safer than implementing the service at the operating system level of an authentication server as in the prior art network of FIG. 1. The disk drive 22 is less susceptible to virus attacks because the firmware implemented by the disk controller 34 is essentially static, as determined by the manufacturing process, and facilities can be employed to monitor the firmware for tampering. For example, in one embodiment the firmware is stored with CRC check bytes which are used to verify that the firmware has not been modified before execution. In another embodiment, the cryptographic circuitry 38 and associated cryptographic keys comprise tamper-resistant circuitry embedded within an integrated circuit (IC). An example discussion of tamper-resistant circuitry is provided in Tygar, J. D. and Yee, B. S., "Secure Coprocessors in Electronic Commerce Applications," Proceedings 1995 USENIX Electronic Commerce Workshop, 1995, New York, which is incorporated herein by reference.

In one embodiment, the cryptographic circuitry 38 comprises an immutable secret drive key configured during manufacture of the disk drive, wherein the secret drive key is used to encrypt the user access data 30. This embodiment enhances security by protecting against discovery of the secret drive key through human error, that is, by obviating the need for the system administrator 12 to configure the secret drive key. If an attacker steals the disk drive 22, the user access data stored on the disk 32 is protected from discovery by protecting the secret drive key using tamper-resistant circuitry or other similar protective measures.

In another embodiment, the disk 32 stores encrypted device access data associated with network devices connected to a network. The device access data is used to authenticate device access requests transmitted from client computers to the network devices. In one embodiment, the encrypted device access data comprises an encrypted secret device key shared with a corresponding network device. In one embodiment, the device access data is initially configured by a system administrator 12. Unencrypted device access data is supplied to the disk drive 21 through its interface 28, encrypted by the cryptography circuitry 38 to generate encrypted device access data, and the encrypted device access data is written to the disk 32. In an alternative embodiment, the encrypted device access data is stored on the disk 32 during manufacture of the disk drive 21. This embodiment enhances security by protecting against discovery of the secret device keys through human error, that is, by obviating the need for the system administrator 12 to configure the secret device keys. In yet another embodiment, the encrypted device access data is transmitted from a network device to the disk drive 21 when the network device is added to the network.

Figure 4:
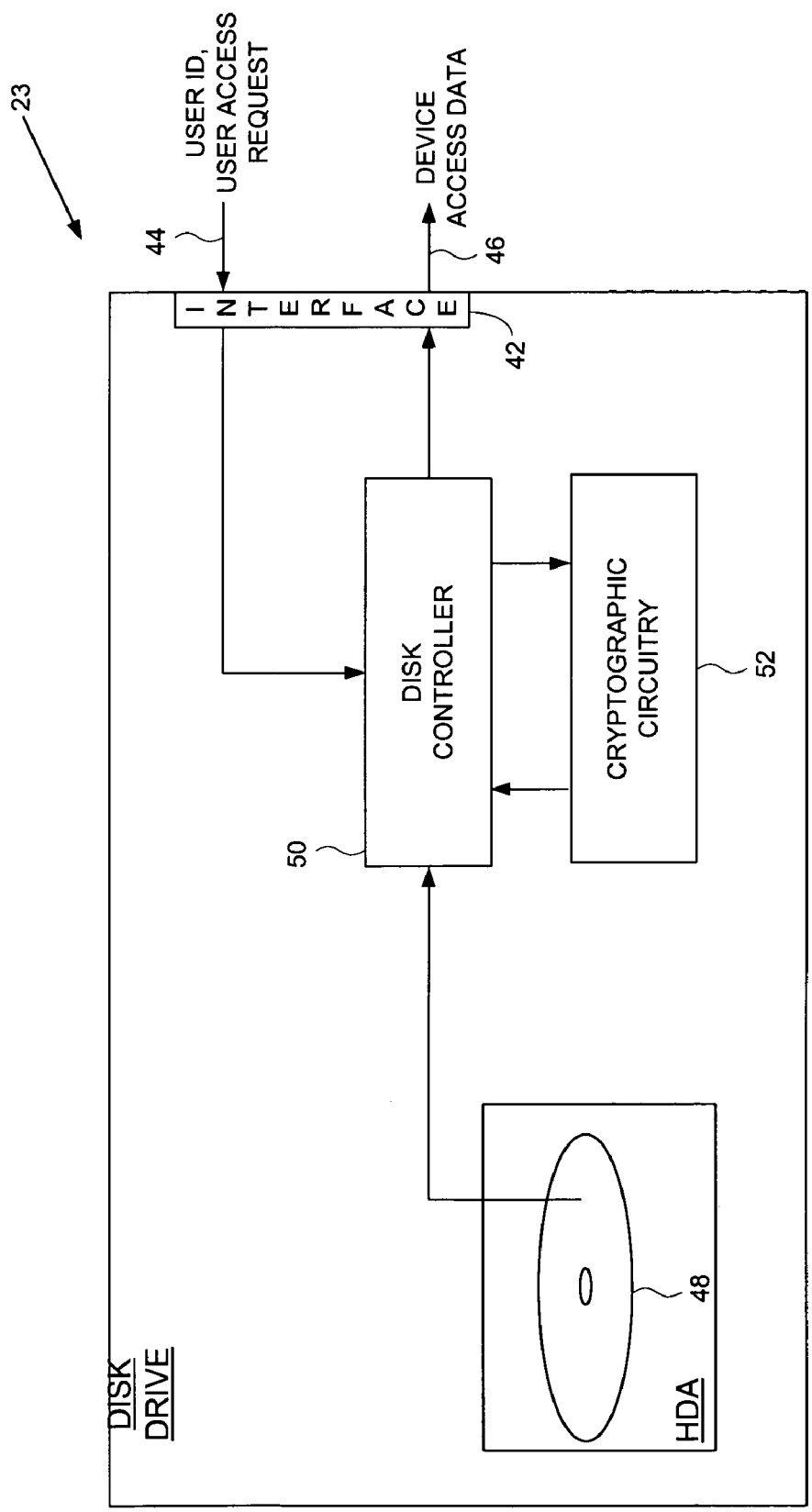
FIG. 4 shows a disk drive according to an embodiment of the present invention which receives a user ID and a user access request from a client computer and outputs device access data to the client computer. The disk drive comprises a disk controller for accessing encrypted data stored on a disk, cryptographic circuitry for decrypting the encrypted data, and an authenticator, responsive to the user ID, for enabling the disk controller.

FIG. 4 shows a disk drive 23 for use in a computer network according to another embodiment of the of the present invention. The disk drive 23 comprises an interface 42 for receiving from a client computer a user ID and a user access request 44 to access a network device, and for transmitting device access data 46 to the client computer. The disk drive 23 further comprises a disk 48 for storing encrypted data, and a disk controller 50, responsive to the user ID and user access request 44, for controlling access to the disk 48. Cryptographic circuitry 52 within the disk drive 23 decrypts the encrypted data stored on the disk 48 to generate decrypted data, and the disk controller 50 uses the decrypted data to generate the device access data 46 transmitted to the client computer.

In an embodiment shown in FIG. 2, the disk drive 23 of FIG. 4 is a disk drive 22 connected to an authentication server computer 24, and the client computer 18 communicates with the authentication server computer 24 through network routing facilities 10. For example, the client computer 18 may desire access to a server 54 connected to the network. The server 54 comprises a computer 56 and a disk drive 58 connected to the computer 54. In order to access the server 54, the user 16 operating the client computer 18 sends a user ID and an access request 44 through the network routing facilities 10 to the authentication server computer 24, and ultimately to the disk drive 22 connected to the authentication server computer 24. The disk drive 22 (disk drive 23 of FIG. 4) stores encrypted user authentication data on the disk 48 corresponding to the user ID received from the client computer 18. The cryptography circuitry 52 within the disk drive 22 decrypts the encrypted user authentication data stored on the disk 48 to generate decrypted user authentication data, and the disk controller 50 uses the decrypted user authentication data to generate device access data 46 transmitted to the client computer 18 for use in accessing the server 54.

In one embodiment, the encrypted user authentication data comprises an encrypted user password corresponding to the user ID received from the user 16. The disk controller 52 reads the encrypted user password from the disk 48 corresponding to the user ID. The cryptographic circuitry 52 decrypts the encrypted user password to generate a decrypted user password, and the decrypted user password is used to generate the device access data 46 transmitted to the client computer 18.

In one embodiment, the cryptographic circuitry 52 encrypts the device access data 46 before transmission to the client computer 18. In one embodiment, the cryptographic circuitry 52 encrypts the device access data using a cryptographic user key extracted from the decrypted user authentication data (e.g., the decrypted user password). In one embodiment, the cryptographic user key is generated by the cryptographic circuitry 52 using the decrypted authentication data (e.g., the decrypted user password). In one embodiment, the cryptographic user key is a private key for use in a private key encryption algorithm (symmetric algorithm), and in an alternative embodiment the cryptographic user key is a public key for use in a public key encryption algorithm (asymmetric algorithm).

The encrypted device access data 46 can only be decrypted with a user key associated with the user ID and known only to the trusted user having been assigned the user ID. In one embodiment, the client computer 18 generates the user key using a password provided by the user 16. Thus, the user key can only be generated if the user 16 operating the client computer 18 is in possession of the trusted password.

In one embodiment, the cryptographic circuitry 52 encrypts the device access data using a secret device key shared with the network device, where the secret device key is used by the network device to authenticate device access requests received from client computers. In one embodiment, the secret device key shared with the network device is stored in encrypted form on the disk 48 and decrypted by the cryptographic circuitry 52.

In yet another embodiment, the cryptographic circuitry 52 comprises an immutable secret drive key configured during manufacture of the disk drive, wherein the secret drive key is used to decrypt the encrypted data stored on the disk 48. Similar to the embodiment described above with reference to FIG. 3, this embodiment enhances security by protecting against discovery of the secret drive key through human error, that is, by obviating the need for the system administrator 12 to configure the secret drive key. If an attacker steals the disk drive 22, the data stored on the disk 32 is protected from discovery by protecting the secret drive key using tamper-resistant circuitry or other similar protective measures.

Figure 5:
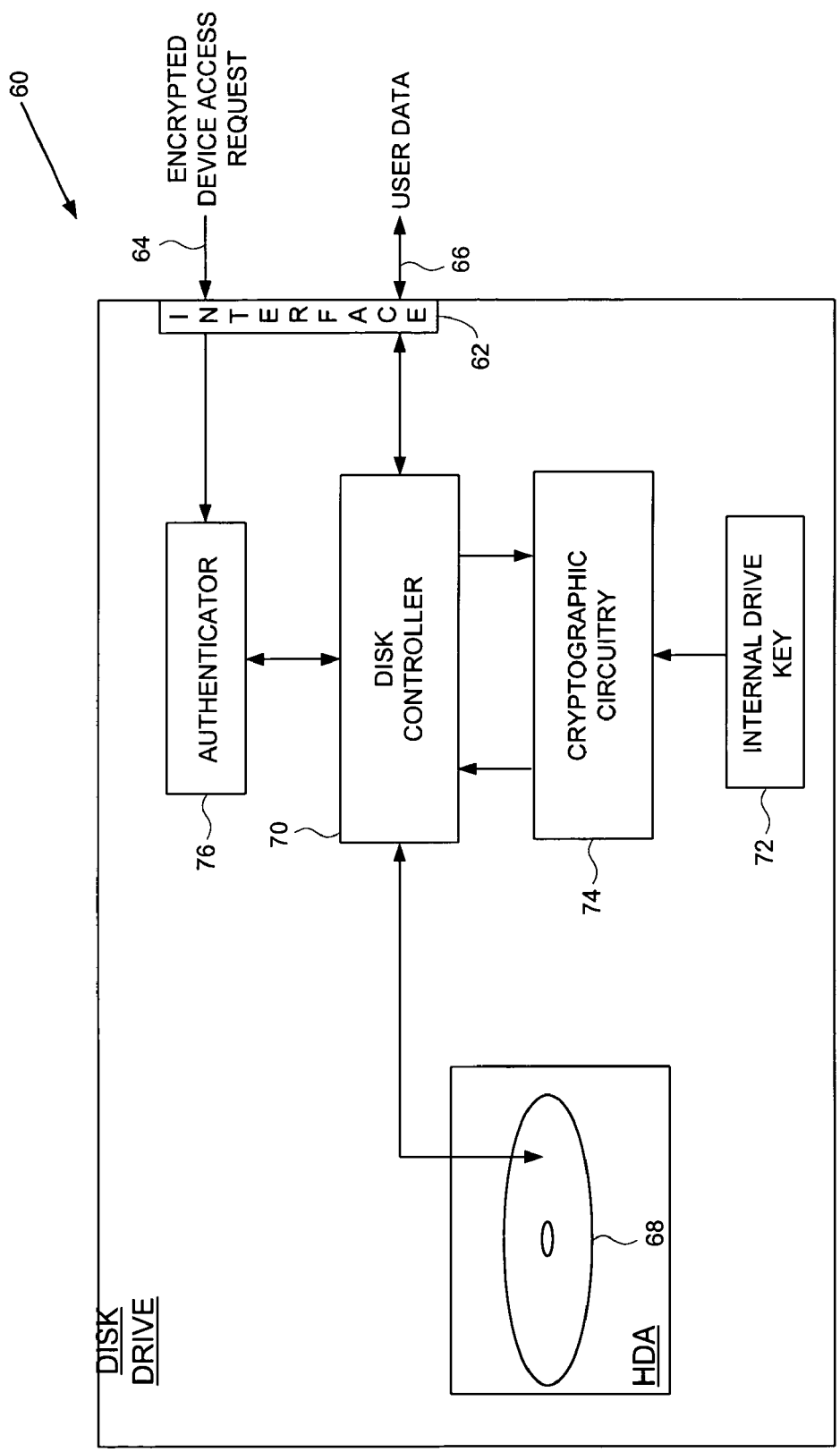
FIG. 5 shows a disk drive according to an embodiment of the present invention which receives an encrypted device access request and inputs/outputs user data from/to a client computer. The disk drive comprises an internal drive key for decrypting a secret device key shared with an authentication server, wherein the secret drive key is used to decrypt the device access request in order to authenticate the device access request.

FIG. 5 shows a disk drive 60 for use in a computer network according to another embodiment of the of the present invention. The disk drive 60 comprises an interface 62 for receiving an encrypted device access request 64 and for inputting/outputting user data 66 from/to a client computer, a disk 68 for storing data, and a disk controller 70 for controlling access to the disk 68. The disk drive 60 further comprises an internal drive key 72, and a secret device key shared with an authentication server, the secret device key stored in encrypted form. Cryptographic circuitry 74, responsive to the internal drive key 72, decrypts the encrypted secret device key to generate a decrypted secret device key, and an authenticator 76, responsive to the decrypted secret device key, authenticates the device access request 64.

In an embodiment illustrated in FIG. 2, the disk drive 60 of FIG. 5 is a disk drive connected to a network (e.g., disk drive 58 connected to a server computer 56 or a disk drive connected directly to the network as a network attached storage device (NASD)). The secret device key within the disk drive 58 is shared with an authentication server and used to authenticate user access requests. The authentication server uses the secret device key to encrypt device access data transmitted to a client computer 18 requesting access to the disk drive 58, and the disk drive 58 uses the secret device key to authenticate access requests received from the client computer 18.

In one embodiment, the secret device key is stored in encrypted form on the disk 68. When a device access request is received from a client computer, the disk controller reads the encrypted secret device from the disk 68 and the cryptography circuitry 74 decrypts the encrypted secret drive key to generate the decrypted secret drive key used to authenticate the device access request.

In another embodiment, the encrypted secret device key is configured during manufacture of the disk drive 60, and the disk drive 60 transmits the encrypted secret device key to the authentication server when the disk drive 60 is added to the network (e.g., added as drive 58 in FIG. 2). This embodiment enhances the security of the authentication service by avoiding discovery through human error, that is, by obviating the need for a system administrator 12 to configure the secret device key. In another embodiment, the internal drive key 72 comprises tamper-resistant circuitry which protects against an attacker who probes the disk drive 60 attempting to discover the secret device key.

I claim:

1. A computer network comprising a plurality of interconnected network devices including:
   (a) a plurality of client computers;
   (b) an authentication server computer operated by a system administrator; and
   (c) a disk drive connected to the authentication server computer, the disk drive comprising:
      an interface for receiving personal authentication data and user access data from the system administrator;
      a disk for storing data;
      a disk controller for controlling access to the disk;
      an authenticator, responsive to the personal authentication data, for enabling the disk controller; and
      cryptographic circuitry for encrypting the user access data received from the system administrator into encrypted data stored on the disk;
   wherein:
      the user access data comprises a plurality of user identifiers and corresponding access rights to the plurality of network devices;
      the disk stores encrypted device access data associated with the network devices;
      the device access data for use in authenticating device access requests transmitted from client computers to the network devices; and
      the encrypted device access data is stored on the disk during manufacture of the disk drive.

2. The computer network as recited in claim 1, wherein the user access data further comprises user authentication data.

3. The computer network as recited in claim 2, wherein the user authentication data comprises a user password.

4. The computer network as recited in claim 1, wherein the personal authentication data comprises a user password.

5. The computer network as recited in claim 1, wherein:
   (a) the cryptographic circuitry comprises an immutable secret drive key configured during manufacture of the disk drive; and
   (b) the secret drive key for use in encrypting the user access data.

6. The computer network as recited in claim 1, wherein the encrypted device access data comprises an encrypted secret device key shared with a corresponding network device.

7. The computer network as recited in claim 1, wherein:
   (a) the interface receives unencrypted device access data; and
   (b) the cryptographic circuitry encrypts the unencrypted device access data into the encrypted device access data stored on the disk.

8. The computer network as recited in claim 1, wherein the encrypted device access data is transmitted from the network devices to the disk drive.

9. A computer network comprising a plurality of interconnected network devices including:
   (a) a plurality of client computers;
   (b) an authentication server computer; and
   (c) a disk drive connected to the authentication server computer, the disk drive comprising:
      an interface for receiving from a client computer a user ID and a user access request to access a network device, and for transmitting device access data to the client computer;
      a disk for storing encrypted data;
      a disk controller, responsive to the user ID and user access request, for controlling access to the disk; and cryptographic circuitry for decrypting the encrypted data stored on the disk to generate decrypted data;
wherein the disk controller uses the decrypted data to generate the device access data transmitted to the client computer.

10. The computer network as recited in claim 9, wherein:
(a) the encrypted data comprises encrypted user authentication data corresponding to the user ID; and
(b) the cryptographic circuitry decrypts the encrypted user authentication data to generate decrypted user authentication data.

11. The computer network as recited in claim 10, wherein the decrypted user authentication data comprises a user password.

12. The computer network as recited in claim 9, wherein the cryptographic circuitry encrypts the device access data before transmission to the client computer.

13. The computer network as recited in claim 10, wherein:
(a) the cryptographic circuitry encrypts the device access data before transmission to the client computer; and
(b) the cryptographic circuitry encrypts the device access data using a cryptographic user key extracted from the decrypted user authentication data.

14. The computer network as recited in claim 13, wherein the cryptographic user key is generated by the cryptographic circuitry using the decrypted user authentication data.

15. The computer network as recited in claim 13, wherein the cryptographic user key is a public key for use in a public key encryption algorithm.

16. The computer network as recited in claim 9, wherein:
(a) the cryptographic circuitry encrypts the device access data using a secret device key shared with the network device; and
(b) the secret device key is used by the network device to authenticate device access requests received from client computers.

17. The computer network as recited in claim 16, wherein the secret device key shared with the network device is stored in encrypted form on the disk and decrypted by the cryptography circuitry.

18. The computer network as recited in claim 9, wherein:
(a) the cryptographic circuitry comprises an immutable secret drive key configured during manufacture of the disk drive; and
(b) the secret drive key for use in decrypting the encrypted data stored on the disk.

19. A computer network comprising a plurality of interconnected network devices including:
(a) a plurality of client computers;
(b) an authentication server; and
(c) a disk drive comprising:
an interface for receiving an encrypted device access request and for inputting/outputting user data from/to a client computer;
a disk for storing data;
a disk controller for controlling access to the disk;
an internal drive key;
a secret device key shared with the authentication server, the secret device key stored in encrypted form;
cryptographic circuitry, responsive to the internal drive key, for decrypting the encrypted secret device key to generate a decrypted secret device key; and
an authenticator, responsive to the decrypted secret device key, for authenticating the device access request.

20. The computer network as recited in claim 19, wherein the encrypted secret device key is stored on the disk.

21. The computer network as recited in claim 19, wherein the encrypted secret device key is configured during manufacture of the disk drive.

22. The computer network as recited in claim 19, wherein the disk drive transmits the encrypted secret device key to the authentication server.

23. The computer network as recited in claim 19, wherein the internal drive key comprises tamper-resistant circuitry.

* * * * *